US011956296B2

United States Patent
Werner et al.

(10) Patent No.: US 11,956,296 B2
(45) Date of Patent: Apr. 9, 2024

(54) STREAM ALTERATIONS UNDER LIMITED BANDWIDTH CONDITIONS

(71) Applicant: INTERNATIONAL BUSINESS MACHINES CORPORATION, Armonk, NY (US)

(72) Inventors: John S. Werner, Fishkill, NY (US); Arkadiy O. Tsfasman, Wappingers Falls, NY (US); Sagarika Mukesh, Albany, NY (US)

(73) Assignee: International Business Machines Corporation, Armonk, NY (US)

( * ) Notice: Subject to any disclaimer, the term of this patent is extended or adjusted under 35 U.S.C. 154(b) by 148 days.

(21) Appl. No.: 17/474,416

(22) Filed: Sep. 14, 2021

(65) Prior Publication Data
US 2023/0078266 A1  Mar. 16, 2023

(51) Int. Cl.
| | | |
|---|---|---|
| H04L 65/75 | (2022.01) | |
| H04L 43/0876 | (2022.01) | |
| H04L 43/16 | (2022.01) | |
| H04L 45/00 | (2022.01) | |
| H04L 65/61 | (2022.01) | |

(52) U.S. Cl.
CPC ........ *H04L 65/765* (2022.05); *H04L 43/0876* (2013.01); *H04L 43/16* (2013.01); *H04L 45/70* (2013.01); *H04L 65/61* (2022.05)

(58) Field of Classification Search
None
See application file for complete search history.

(56) References Cited

U.S. PATENT DOCUMENTS

| 7,962,637 | B2 | 6/2011 | Su |
| 9,015,335 | B1 | 4/2015 | Gigliotti |
| 10,616,294 | B2 | 4/2020 | Shribman |
| 10,728,297 | B2 | 7/2020 | Zhu |

(Continued)

FOREIGN PATENT DOCUMENTS

WO    2023041292 A1    3/2023

OTHER PUBLICATIONS

International Searching Authority, "Notification of Transmittal of the International Search Report and the Written Opinion of the International Searching Authority, or Declaration," Patent Cooperation Treaty, dated Nov. 21, 2022, 12 pages, International Application No. PCT/EP2022/073432.

(Continued)

*Primary Examiner* — Alex Skripnikov
*Assistant Examiner* — Angelie T Ngo
(74) *Attorney, Agent, or Firm* — Teddi E. Maranzano

(57) ABSTRACT

Stream alterations under limited bandwidth conditions is provided. A router on a local network continuously monitors incoming network traffic from a source external to the local network to detect that a bandwidth of the incoming network traffic exceeds a first threshold. The router sends a request to a source of the incoming network traffic to temporarily redirect the incoming network traffic to an optimization analyzer. Analysis is performed on the incoming streams to identify one or more streams for alteration. In response to identifying one or more of the incoming streams for alteration, for each identified incoming stream, continuously altering the identified incoming stream, and re-directing the altered stream to the local device.

12 Claims, 3 Drawing Sheets

(56) References Cited

U.S. PATENT DOCUMENTS

| | | | |
|---|---|---|---|
| 2003/0046704 A1 | 3/2003 | Laksono | |
| 2014/0317183 A1 | 10/2014 | Shah | |
| 2016/0014471 A1* | 1/2016 | Dadheech | H04N 21/64738 725/116 |
| 2017/0078202 A1 | 3/2017 | Connor | |
| 2018/0288121 A1 | 10/2018 | Zhu | |
| 2019/0019517 A1* | 1/2019 | Min | G10L 15/26 |
| 2019/0222619 A1 | 7/2019 | Shribman | |
| 2019/0379718 A1 | 12/2019 | Mueller | |
| 2020/0196191 A1* | 6/2020 | Deparisse | H04L 47/125 |
| 2021/0112116 A1* | 4/2021 | Baccour | H04L 65/80 |
| 2021/0183227 A1* | 6/2021 | Kovscek | G08B 21/18 |
| 2021/0183374 A1* | 6/2021 | Thomson | G10L 15/30 |
| 2022/0239601 A1* | 7/2022 | Bouazizi | H04L 47/78 |
| 2022/0247685 A1* | 8/2022 | Means | H04L 45/748 |
| 2023/0052385 A1* | 2/2023 | Shah | H04N 21/4532 |
| 2023/0064892 A1* | 3/2023 | Carter | G08B 13/19608 |
| 2023/0100435 A1* | 3/2023 | Raleigh | H04M 15/8083 455/406 |

OTHER PUBLICATIONS

Werner, et al., "Stream Alterations Under Limited Bandwidth Conditions," Application and Drawings, Filed on Aug. 23, 2022, 21 Pages, Related PCT Patent Application Serial No. PCT/EP2022/073432.

Cronin, et al., "Measurement and Use of Streaming Data Quality Indicator," IP.com, Jul. 3, 2009, 6 pages, IP.com No. IPCOM000184887D, Retrieved from the Internet: <URL: https://priorart.ip.com/IPCOM/000184887>.

Disclosed Anonymously, "Method and Apparatus of Online Video Streaming with Limited Network Bandwidth," IP.com, Mar. 10, 2019, 5 pages, IP.com No. IPCOM000257771D, Retrieved from the Internet: <URL: https://priorart.ip.com/IPCOM/000257771>.

Disclosed Anonymously, "System and Method for Predictive Bandwidth Modification for Enhancing Delivery of Streaming Content Using Contextual Clues in Mobile Devices," IP.com, May 9, 2012, 6 pages, IP.com No. IPCOM000217613D, Retrieved from the Internet: <URL: https://priorart.ip.com/IPCOM/000217613>.

Hiebl, et al., "Towards a Framework for Data Stream Processing in the Fog," Informatik Spektrum, 2019, vol. 42, pp. 256-265, Springer Nature, Retrieved from the Internet: <URL: https://doi.org/10.1007/s00287-019-01192-z>.

Hossain, et al., "Multimodal fusion for multimedia analysis: A survey," Multimedia System, Nov. 2010, 36 pages, vol. 16, Issue: 6, ResearchGate, DOI: 10.1007/s00530-010-0182-0, Retrieved from the Internet: <URL: https://www.researchgate.net/publication/220460981_Multimodal_fusion_for_multimedia_analysis_A_survey>.

Keary, "8 Best Bandwidth Limiter Tools," Comparitech.com, May 21, 2021 [accessed on Sep. 14, 2021], 28 pages, Retrieved from the Internet: <URL: https://www.comparitech.com/net-admin/best-bandwidth-limiter-tools/>.

Sachs, et al., "From Active Data Management to Event-Based Systems and More," Lecture Notes in Computer Science, 353 pages, 1973, vol. 6462, Springer, ISSN: 0302-9743, Retrieved from the Internet: <URL: https://link.springer.com/book/10.1007%2F978-3-642-17226-7>.

* cited by examiner

STREAM ALTERATIONS UNDER LIMITED BANDWIDTH CONDITIONS

BACKGROUND

Embodiments of the present invention generally relate to computer systems, and more specifically to networking bandwidth.

Internet service has become increasingly important to the consumer. Initially developed to provide general access to the world wide web, consumer internet service now includes video and audio streaming services, IP telephony, and virtual meeting services. It may be typical for mixed demands to be placed on the bandwidth of an internet service. For example, multiple users at a location may be simultaneously streaming a video, engaging in a telephone conversation, gaming, and participating in a Zoom meeting. Each of the users may experience poor performance because the single bandwidth is distributed among the competing demands.

One option is to upgrade internet service to a plan having more bandwidth, but that may not be possible either due to availability or expense of an upgraded plan.

It would be advantageous to alter and distribute incoming streams so that not all users on a network are impacted when the bandwidth is limited.

SUMMARY

Stream alterations under limited bandwidth conditions is provided. A router on a local network continuously monitors incoming network traffic from a source external to the local network to detect that a bandwidth of the incoming network traffic exceeds a first threshold. The router sends a request to a source of the incoming network traffic to temporarily redirect the incoming network traffic to an optimization analyzer. Analysis is performed on the incoming streams to identify one or more stream for alteration. In response to identifying one or more of the incoming streams for alteration, for each identified incoming stream, continuously altering the identified incoming stream, and re-directing the altered stream to the local device.

Additional features and advantages are realized through the techniques described herein. Other embodiments and aspects are described in detail herein. For a better understanding, refer to the description and to the drawings.

BRIEF DESCRIPTION OF THE SEVERAL VIEWS OF THE DRAWINGS

The subject matter which is regarded as the present invention is particularly pointed out and distinctly claimed in the claims at the conclusion of the specification. The foregoing and other features and advantages are apparent from the following detailed description taken in conjunction with the accompanying drawings in which:

DETAILED DESCRIPTION

Figure 1:
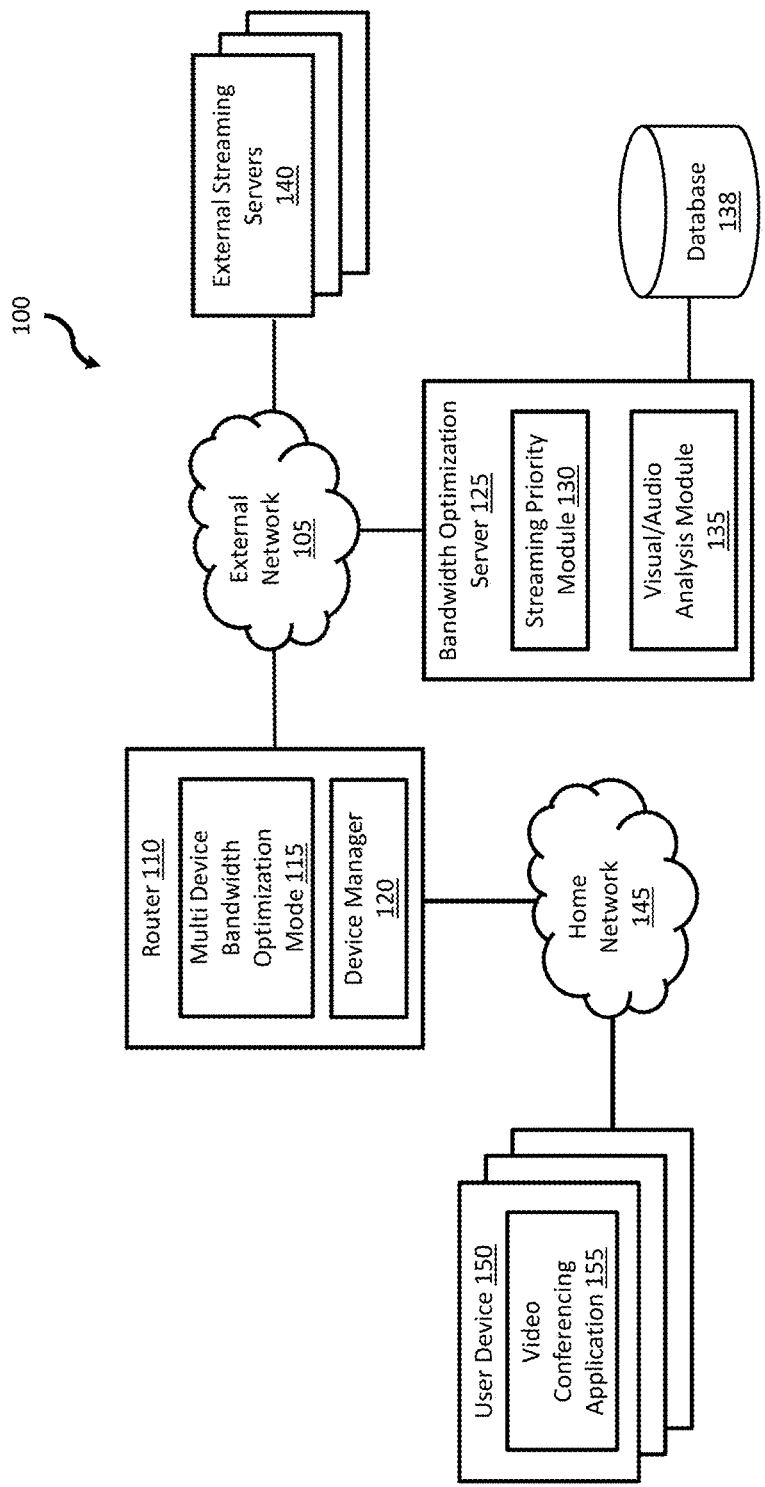
FIG. 1 is a functional block diagram of an illustrative system for stream alterations under limited bandwidth conditions, according to an embodiment of the invention.

The present disclosure relates generally to the field of user computing technologies, and in particular to altering streams under limited bandwidth conditions.

Internet service has become increasingly important to the consumer. Initially developed to provide general access to the world wide web, consumer internet service now includes video and audio streaming services, IP telephony, and virtual meeting services. It may be typical for mixed demands to be placed on the bandwidth of an internet service. For example, multiple users at a location may be simultaneously streaming a video, engaging in a telephone conversation, gaming, and participating in a Zoom meeting. Each of the users may experience poor performance because the single bandwidth is distributed among the competing demands. However, performance may not necessarily be uniformly poor, which may add to a user's frustration. For example, performance may vary unpredictably among the users if an application makes a connection and consumes a large percentage of the bandwidth. The remaining bandwidth is distributed among the remaining users, giving diminished performance. When the first user's connection is released, performance may spike, at least temporarily, until another connection claims the bandwidth.

Embodiments of the present invention address these described drawbacks. Disclosed is a smart way to provide high fidelity video by switching the bandwidth allocation between devices, and by monitoring the incoming content such that the experience of all users is improved, thereby preventing the users from missing important content within their stream.

In one embodiment, if multiple users are online at the same time, smart decisions are made regarding which user needs to see live video based on real time analysis of the streamed content. For example, if a presenter is talking but not performing activities, such as writing on a board, pointing, or displaying something to the class, the stream can temporarily switch to audio only, thereby saving bandwidth that can be available to other users.

As another example, if a slide presentation is being shared, but the presenter is not actively pointing to the presentation with the mouse, the slide can temporarily be frozen on the screen and only audio is shared, similarly saving bandwidth.

One way to achieve improved bandwidth usage is by an agent that is installed on the network's router 110, performed by multi device bandwidth optimization mode 115. For conferencing applications, the agent may be installed on the bandwidth optimization server 125, as the streaming priority module 130. The agent is configured to identify and monitor specific user routers, for example by IP address. Each of the monitored user routers may report to the agent that the router is nearing its bandwidth limit, for example by being within a configurable threshold of a percentage of bandwidth capacity. In response, the agent may modify the upcoming content from the server to the user router and then on to the device.

The agent, when operating on a third-party server, may be enhanced to monitor for streams coming from different sources (i.e., different service providers). There may be one or more agents to monitor and alter each configured source and one or more agents to manage transmitting the streams to the routers of the subscribed users.

Embodiments of the invention will now be described in more detail in connection with the Figures.

FIG. 1 is a functional block diagram 100 of an illustrative system for stream alterations under limited bandwidth conditions (system), according to an embodiment of the invention.

The system 100 includes external streaming servers 140, a bandwidth optimization server 125, a router 110, and at least one local user device 150. The router 110, the external streaming servers 140 and the bandwidth optimization server 125 are interconnected via a wired or wireless external network 105. The bandwidth optimization server 125 may operate in one or more containers on the external streaming server 140.

The user devices 150 can include any device able to process input and output of audio and/or video. The user devices 150 connect to the router 110 through a home network 145. In this context, home network also includes a network within a school, college, or office where video conferencing occurs regularly, and therefore a higher demand for bandwidth is normal.

The video conferencing application 155 includes any platform/application for video conferencing including Zoom, Google Talk, WebEx, Skype, etc. The video conferencing application 155 receives data streams (which may be altered or unaltered) from the device manager 120 on router 110. The streaming priority module 130 and the visual/audio analysis module 135 on the bandwidth optimization server 125 alter the incoming stream if necessary. The operation of these modules is discussed further with reference to FIG. 2.

The external network 105 may comprise any communication protocol that allows data transfers between components of the system 110, such as Wi-Fi, Bluetooth, Ethernet, fiber optics, or 3G (and other compatible versions). Wired and/or wireless home network 145 may comprise any communication protocol that allows data transfers between components of the system 100, such as Bluetooth, Wi-Fi, Ethernet, or 3G (and other compatible versions).

The one or more external streaming servers 140 host communication services on behalf of an entity, such as a business enterprise, hospital, or school, for example, and the entity's subscribers (e.g., employees, students, etc.). The communication services may include instances of Zoom, Google Talk, WebEx®, Skype, and other similar communication services.

The bandwidth optimization server 125 comprises a streaming priority module 130, visual/audio analysis module 135. The bandwidth optimization server 125 may be a third-party service through which users agree to route incoming streaming video, or other entertainment services, for example, by subscribing to the service.

The streaming priority module 130 is enabled when the multi device bandwidth optimization mode 115 detects that a first bandwidth on the home network 145 exceeds a configurable threshold. The streaming priority module 130 continues to operate until the bandwidth on the home network 145 falls below a second configurable threshold, that is lower than the first threshold. This bandwidth range ensures sufficient bandwidth utilization on the home network 145 for streaming operations without intercepting and altering the incoming stream.

The one or more streams to the home network 145 are redirected to the streaming priority module 130 which uses input from the visual/audio analysis module 135 to calculate how to temporarily alter the stream to reduce overall bandwidth. The altered stream is sent as output to the router 110. Alterations include, but are not limited to, switching to audio only, reducing the bitrate of visuals, and/or freezing visuals. Which alteration is performed may depend on the amount of bandwidth reduction required for a given user. It is also dependent upon what would be the least disruptive to the user. For example, freezing a visual would be preferred for a PowerPoint where the presenter is not using their pointer. Freezing a visual would not be preferred if a science teacher is performing an experiment on camera. A reduced bitrate would be preferred in that scenario, the goal being to perform the least amount of alteration to get under the user's bandwidth requirement. There may be one or more streams under consideration for alteration and one or more possible alterations to perform. The prediction of how much bandwidth reduction a particular alteration may provide is then considered for each of the multiple active streams to determine what works best for getting under the bandwidth limits.

The redirection is based on router 110 having a source IP and a destination route which may contain multiple gateways, and a destination IP address. Since multiple users may be subscribed to the content on the external streaming server 140, connectivity is maintained by the IP address of the specific user device 150. Connectivity among the components of the system 100 is maintained using known TCP/IP protocols.

For example, if the streaming priority module 130 detects that bandwidth is above the threshold on router 110, filtering recognizes, by IP address, the data source of the request. The router 110 updates a "route to" field with the IP address of the bandwidth optimization server 125. The data packets themselves are not delivered from the external streaming server 140 to the router 110, only the request. The data packets are then routed to bandwidth optimization server 125 IP address for alteration, then routed from the bandwidth optimization server 125 IP address to the user device 150. Once the bandwidth on the home network 145 falls below the second threshold, the "route to" field on the router 110 for data requests coming from 140 will be updated to send data packets directly to the user device 150.

For web conferences, the streaming priority module 130 may alter the stream by only passing the audio signal through when it is determined that video is not required temporarily. The streaming priority module 130 performs the content modification before sending the altered content to the router 110. To optimize resource utilization on the bandwidth optimization server 125, specifically memory and CPU, the original stream may be stored in a database 138. In this case, the stream may be processed in segments.

The streaming priority module 130 invokes the visual/audio analysis module 135, that is trained to recognize signs/signals that indicate whether video can be temporarily altered. The audio/visual analysis may be performed by a combination of IBM Watson™ APIs, such as IBM Watson™ Visual Recognition, IBM Watson™ Natural Language Understanding, and IBM Watson™ Natural Language Classifier.

For example, IBM Watson™ Visual Recognition uses deep learning algorithms so analyze images for movement in streamed scenes, objects, fares, and other content. The IBM Watson™ Natural Language Understanding may extract metadata from text, such as entities, keywords, categories, sentiment, emotion, relations, and syntax. The IBM Watson™ Natural Language Classifier can be used to build custom text classification models to be used to perform Natural Language Processing (NLP) to tokenize and parse language into elemental pieces. NLP includes parsing, stopword removal, part-of-speech tagging, in addition to tokenizing. NLP processing free form natural language text into a standardized structure that can be input to other processing, as needed. However, implementations of the present invention are not limited to IBM APIs. Other candidate APIs, include those of Google Cloud Natural Language, Google CloudVision, Amazon Rekognition, and Microsoft Text Analytics.

Through the APIs, the visual/audio analysis module 135 may be trained to recognize movement and sound from the stream. Some examples include, one or more people speaking with each other, as in an entertainment video; a person presenting information to a group, as in an online class or meeting; one or more people interacting with an object, as in gesturing, moving a mouse, laser pointer, etc.; one or more people exchanging conversation, as when collaborating in an online meeting); and one or more people interacting with the environment, as in writing, changing slides in a presentation, demonstrating steps to perform a task.

The audio/visual analysis may be performed by a combination of IBM Watson™ APIs. For example, IBM Watson™ Visual Recognition uses deep learning algorithms to analyze images for scenes, objects, faces, and other content. IBM Watson™ Speech to Text enables speech transcription for use cases such as speech analytics. Speech is converted to text and analyzed for language patterns that can be tagged and categorized. Silence is also factored into the language pattern, as well as any sighs and inaudible sounds. The IBM Watson™ Natural Language Understanding may extract metadata from text, such as entities, keywords, categories, sentiment, emotion, relations, and syntax. The IBM Watson™ Natural Language Classifier can be used to build custom text classification models to be used to perform Natural Language Processing (NLP) to tokenize and parse language into elemental pieces. NLP includes parsing, stop-word removal, part-of-speech tagging, in addition to tokenizing. NLP processing free form natural language text into a standardized structure that can be input to other processing, as needed.

The audio analysis output of the IBM Watson™ Natural Language Understanding may be input to the IBM Watson™ Natural Language Classifier to build custom text classification models to perform Natural Language Processing (NLP) to tokenize and parse language into elemental pieces. The NLP output may be normalized into six categories: concepts, relations, entities, categories, keywords, and semantic roles for further processing by the streaming priority module 130. Word/information proximity, semantic structure, and grammar may be analyzed.

The router 110 acts as a connection hub between the home network 145 and the external network 105. The router 110 includes a multi device bandwidth optimization mode 115 and a device manager 120. In this context, "mode" refers to one of several operational modes available on the router 110. The multi device bandwidth optimization mode 115 may be provided as a software module that may be used within any of the operational modes. The router 110 includes a device manager 120 that routes data to the correct device on the home network 145 and the external network 105.

The thresholds can be set as a default percentage of the bandwidth of the user's home network 145, which is configured within the device properties of router 110. If the thresholds are based on the user's service plan from the service provider, the router 110 may be able to extract the bandwidth information from the service provider. If the router 110 cannot extract the bandwidth, the user may manually enter the plan bandwidth information before enabling the feature. The thresholds are provided within the installation of the mode or may come pre-programmed in the router. The router 110 may determine the bandwidth by detecting the network reaching its limits, where the bandwidth is not otherwise provided. The default threshold limits may be configurable, for example, 80% for a first threshold and 50% for a second threshold.

An administrative user at the home network 145 may enable the multi device bandwidth optimization mode 115, which allows one or more user devices 150 that are under the management of the device manager 120, to monitor the incoming bandwidth. The device manager 120 routes incoming data streams, from the external streaming servers 140 or from the bandwidth optimization server 125, to the destination user device 150.

When the user device 150 detects that a configurable threshold is exceeded, router 110 may update destination routing such that the external servers 140 direct video streams to the bandwidth optimization server 125. The multi device bandwidth optimization mode 115 also receives the altered video stream output of streaming priority module 130. In some embodiments, the user may disable one or more streams from being redirected to the bandwidth optimization server 125, for example to protect transmission and alteration of confidential data. By notifying and allowing bandwidth optimization server 125 to intercept and intelligently alter the streams from external streaming servers 140 for analysis, the bandwidth on router 110 is reduced.

Figure 2:
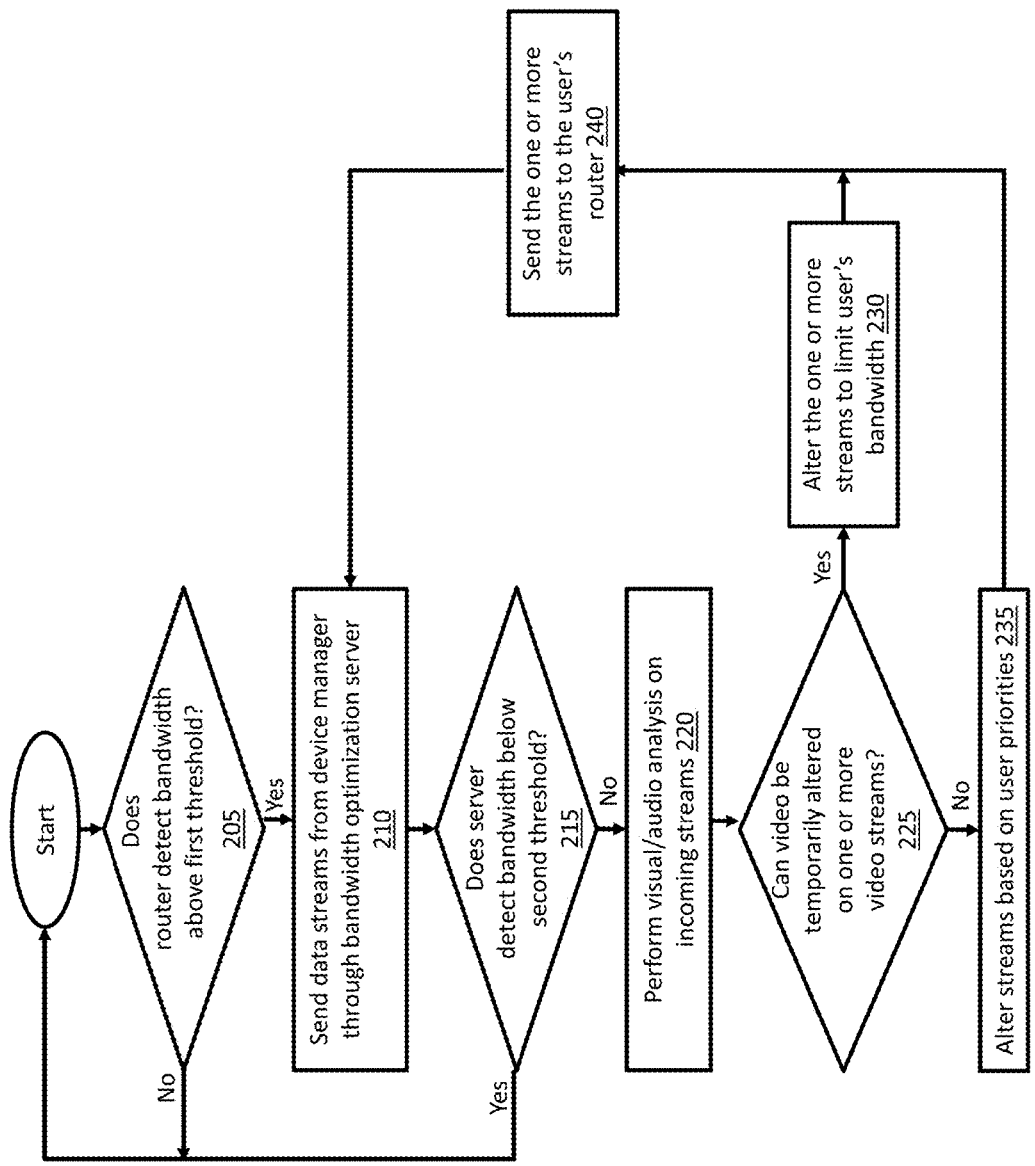
FIG. 2 is a flowchart of automatically and intelligently altering video streams on a router depending on a bandwidth threshold.

FIG. 2 is an exemplary flowchart 200 of the operations executed to alter video streams when the bandwidth of router 110 exceeds a threshold automatically and intelligently.

Method 200 begins with the multi device bandwidth optimization mode 115 of router 110 continually monitoring the incoming traffic to determine if the bandwidth is exceeding a first threshold. The first threshold may be set to the bandwidth limit of the router 110 or the service provider. The first threshold may be set lower than the bandwidth limit of the router 110 or the service provider, for example at 80% or 90%. In some embodiments, a predictive model may be used to anticipate a change in the bandwidth of the incoming traffic based on history. The "yes" branch to block 210 may be taken even if the bandwidth of the incoming traffic is not above the first threshold. An example of a predictive model may include a history where several users access video streams every Monday from 9 AM-12 PM indicating that bandwidth is likely to rise during that window of time.

However, if the bandwidth is below the first threshold (block 205 "No" branch), the method loops back and continues monitoring traffic on the network If the bandwidth is above the first threshold (block 205 "Yes" branch), then at block 210 the multi device bandwidth optimization mode 115 of the router 110 redirects incoming data streams that originates from external servers 140 to go through the bandwidth optimization server 125 rather than going directly to the device manager 120. In some embodiments, the user may have the ability to disable one or more streams from being redirected to the bandwidth optimization server 125, for example, in the interest of protecting confidential data.

At block 215, the multi device bandwidth optimization mode 115 of the router 110 continues to detect changes in the redirected bandwidth. A change in bandwidth below a configurable second threshold specific to the user's router 110, such as 50%, may indicate that incoming traffic may no longer be an issue. In some embodiments, the multi device bandwidth optimization mode 115 may wait for a configurable duration of time during which incoming traffic is below the second threshold (e.g., 30 minutes) to account for variability of incoming data streams.

If the redirected bandwidth is below the second threshold (block 215 "Yes" branch), the multi device bandwidth optimization mode 115 loops back to the start where incoming traffic will be directed to the router 110 and no longer redirected to the bandwidth optimization server 125.

Continuing with block 215, if the redirected bandwidth is at or above the second threshold (block 215 "No" branch), the streaming priority module 130 takes over at block 220 where the video/audio analysis module 135 may call a combination of several IBM Watson™ APIs to analyze the video and audio of the incoming streams. For example, IBM Watson™ Speech to Text and IBM Watson™ Natural Language Understanding may analyze the audio of the incoming stream, and IBM Watson™ Visual Recognition may analyze the visual portion of the incoming stream. The video/audio analysis is trained to recognize signs/signals such as: speaking (e.g., converting speech to text and performing NLP on the text); pointing or otherwise gesturing, such as with hands, laser pointer, pointing stick, or mouse pointer; audio where a presenter or attendee asks other attendees to focus attention on the information displayed on the video conference application 155; a presenter or attendee interacting with an object in the environment (e.g., writing on a marker board, chalk board, or similar presentation surfaces, performing an experiment, etc.); a presenter or attendee interacting with something shared on the screen (e.g., actively updating a PowerPoint, mural, taking notes, etc.).

This analysis may be implemented as a neural network with each of the examples above recognized as individual paths of neurons. Multiple layers may be required to identify some of these examples. For example, before recognizing that a teacher is pointing to a marker board, or similar writing and display board, earlier layers may recognize the presence of a person, a marker board, a pointing mechanism, a direction that the person is pointing). The neural network would preferably have multiple outputs (value between 0 and 1) that represent different types of alterations. For example, video may be removed, video may be frozen, audio may be removed. There may be different actions that are activated that would result in the same alteration which increases the output score for that alteration. If those outputs are above a threshold, one or more are executed and the stream is altered at 225.

At block 225, the streaming priority module 130 determines whether one or more the video streams can be altered temporarily. For example a presenter or attendee speaking, but not pointing to anything, showing anything (e.g., slides, textbook images, etc.), or writing on the board may be switched to audio only, or the video quality can be downgraded temporarily since the user does not need to clearly see the video. Similarly, a presenter or attendee is sharing slides, but not actively highlighting anything and nothing is changing on the screen. This stream may temporarily pause/freeze the current slide on the screen and continue to stream the audio such that the user can still follow along, and when the slide changes, the new slide can be paused/frozen on the user's display. Indications that a video stream cannot be altered include, or that normal video streaming may resume include: a presenter or attendee turning to write on a marker board, chalk board, or similar presentation surface, or actively pointing to items displayed on the screen that is being shared, or an active work session where multiple attendees are collaborating on a file such as a PowerPoint or Mural. In some embodiments, users may have an option within video conferencing application 155 or the multi device bandwidth optimization mode 115 of the router 110 to prioritize a video stream, such that the video stream is not subject to being altered. In that case, the video stream bypasses the bandwidth optimization server 125, even if the maximum threshold is exceeded. If a user selects an option not to have the video altered, the router 110 may update the destination path for that stream, thereby bypassing the bandwidth optimization server 125. This prioritization may be used as a cognitive training step for the system 100 to learn the type and frequency of incoming streams (e.g., regular video conference meetings, usual training videos), as well as the level of importance of certain streams to specific users (e.g., regular attendees of regularly scheduled meetings may be considered a preferential stream).

Altering one or more video streams may allow all members of a network (e.g., household) under limited bandwidth to simultaneously attend meetings and/or classes without missing important details. For example, each parent and each of the children may have separate active video conferencing application sessions, with one or two streams altered. The streams that are altered may continuously change dependent upon the analysis and decisions made in blocks 220 and 225.

If one or more of the video streams can be temporarily altered (block 225 "Yes" branch), at block 230 streaming priority module 130 may alter the streams, limit bandwidth, and relay the altered stream to the router 110. The selection of how to alter the stream may depend on the amount of available bandwidth remaining for the user (e.g., lower video quality vs. audio only). Priority on which streams are altered may be given to the stream with the least amount bandwidth change from the original stream to fit within the user's bandwidth limit.

If one or more of the video streams cannot be temporarily altered (block 225 "No" branch), at block 235 the streaming priority module 130 may alter streams based on priority. For example, the user may configure the network such that those attending school always have priority when in class. Alternatively, the multi device bandwidth optimization mode 115 may default to the actions taken by the network provider when a limited bandwidth condition is detected.

In one or more embodiments, the bandwidth optimization server 125 may include a temporary buffer that is dedicated to storing a short portion (e.g., 1 to 2 seconds) of the video stream if video was altered, buffered, and now is to be provided to the end user. This stored video can be pushed to the end user and played back at a slightly faster rate (e.g., 1.5× speed) until the stream catches up to real time video. In this way, if limited bandwidth caused alteration of the stream such that portions of the video were not sent in real time, the user will not miss any of the stream.

At block 240, the streaming priority module 130 routes the altered and/or unaltered video stream to the router 110 which directs the stream to the correct user device 150, and may continue to block 210.

Figure 3:
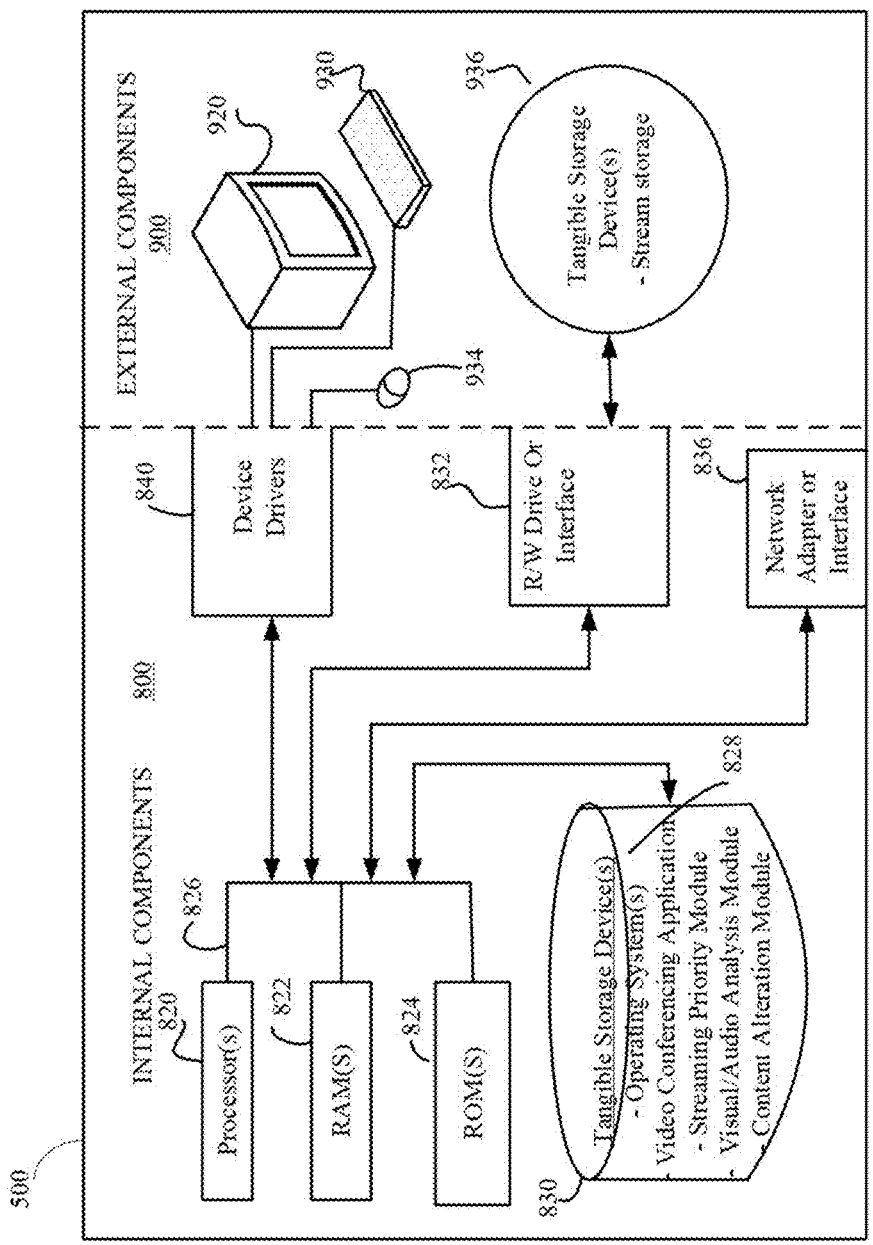
FIG. 3 illustrates an exemplary computing device 500 applicable for executing the method of FIG. 2.

FIG. 3 illustrates an exemplary computing device 500 applicable for executing the algorithm of FIG. 2. Computing device 500 may include respective sets of internal components 800 and external components 900 that together may provide an environment for a software application. Each of the sets of internal components 800 includes one or more processors 820; one or more computer-readable RAMs 822; one or more computer-readable ROMs 824 on one or more buses 826; one or more operating systems, video conferencing application 155, the streaming priority module 130, the visual/audio analysis module 135, 828 executing the algorithm of FIG. 2; and one or more computer-readable tangible storage devices 830. The one or more operating systems 828 are stored on one or more of the respective computer-readable tangible storage devices 830 for execution by one or more of the respective processors 820 via one or more of the respective RAMs 822 (which typically include cache memory). In the embodiment illustrated in FIG. 3, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800 also includes a R/W drive or interface 832 to read from and write to one or more computer-readable tangible storage device(s) 936 such as a CD-ROM, DVD, SSD, USB memory stick, and magnetic disk. In FIG. 3, tangible storage device(s) includes storage for a database 138 in which is stored the visual and audio stream.

Each set of internal components 800 may also include network adapters (or switch port cards) or interfaces 836 such as a TCP/IP adapter cards, wireless WI-FI interface cards, or 3G or 4G wireless interface cards or other wired or wireless communication links. The operating system 828 that is associated with computing device 500, can be downloaded to computing device 500 from an external computer (e.g., server) via a network (for example, the Internet, a local area network, or other wide area network) and respective network adapters or interfaces 836. From the network adapters (or switch port adapters) or interfaces 836 and operating system 828 associated with computing device 500 are loaded into the respective hard drive 830 and network adapter 836.

External components 900 can also include a touch screen 920 and pointing devices 930. The device drivers 840, R/W drive or interface 832 and network adapter or interface 836 comprise hardware and software (stored in storage device 830 and/or ROM 824).

Various embodiments of the invention may be implemented in a data processing system suitable for storing and/or executing program code that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although preferred embodiments have been depicted and described in detail herein, it will be apparent to those skilled in the relevant art that various modifications, additions, substitutions and the like can be made without departing from the spirit of the disclosure, and these are, therefore, considered to be within the scope of the disclosure, as defined in the following claims.

What is claimed is:

1. A method comprising:
continuously monitoring, by a router on a local network, incoming network traffic from a source external to the local network, to detect that a bandwidth of incoming network traffic exceeds a first threshold;
in response to detecting the bandwidth exceeds the first threshold, detecting a source IP address of the incoming network traffic, intercepting the incoming network traffic to one or more local devices and sending a request to a source of the incoming network traffic to temporarily alter the all incoming network traffic to reduce overall bandwidth before redirecting the altered network traffic to an optimization analyzer, wherein the optimization analyzer analyzes the one or more incoming streams to identify one or more of the streams for alteration;
in response to identifying one or more of the incoming streams for alteration;
for each identified incoming stream,
continuously altering the identified incoming stream; and
re-directing the altered stream to the local device;
and
in response to the bandwidth of the altered incoming network traffic falling below a second threshold, stopping the temporarily altering of the incoming network traffic and routing all the incoming network traffic directly to the one or more local devices.

2. The method of claim 1, wherein the incoming network traffic comprises one or more streams, wherein each of the one or more streams comprises video and/or audio, and wherein each of the one or more streams is destined to one or more of the local devices.

3. The method of claim 1, further comprising:
training an optimizing analyzer to recognize movement, sound, and absence of sound from one or more streams of the incoming network traffic;
predicting, by the trained optimizing analyzer, that the bandwidth is exceeded before the bandwidth exceeds the first threshold;
and
based on the predicting and based on an amount of available remaining bandwidth, limiting bandwidth allocated to one or more of the streams, wherein the limiting includes reducing video quality, switching to audio only, and freezing visuals.

4. The method of claim 1, wherein a predictive model anticipates exceeding the bandwidth while the bandwidth is below the first threshold, and wherein based on the anticipation begins routing the incoming network traffic for at least one of the one or more streams to the optimization analyzer.

5. A computer program product, wherein the computer program product comprises a computer readable storage medium having program instructions embodied therewith, the program instructions executable by a processing unit to cause the processing unit to perform a method comprising:
continuously monitoring, by a router on a local network, incoming network traffic from a source external to the local network, to detect that a bandwidth of incoming network traffic exceeds a first threshold;
in response to detecting the bandwidth exceeds the first threshold, detecting a source IP address of the incoming network traffic, intercepting the incoming network traffic to one or more local devices and sending a request to a source of the incoming network traffic to temporarily alter the all incoming network traffic to reduce overall bandwidth before redirecting the altered network traffic to an optimization analyzer, wherein the optimization analyzer analyzes the one or more incoming streams to identify one or more of the streams for alteration;
in response to identifying one or more of the incoming streams for alteration;
for each identified incoming stream,
continuously altering the identified incoming stream; and
re-directing the altered stream to the local device;
and
in response to the bandwidth of the altered incoming network traffic falling below a second threshold, stopping the temporarily altering of the incoming network traffic and routing all the incoming network traffic directly to the one or more local devices.

6. The computer program product of claim 5, wherein the incoming network traffic comprises one or more streams, wherein each of the one or more streams comprises video and/or audio, and wherein each of the one or more streams is destined to one or more of the local devices.

7. The computer program product of claim 5, further comprising:
 training an optimizing analyzer to recognize movement, sound, and absence of sound from one or more streams of the incoming network traffic;
 predicting, by the trained optimizing analyzer, that the bandwidth is exceeded before the bandwidth exceeds the first threshold; and
 based on the predicting and based on an amount of available remaining bandwidth, limiting bandwidth allocated to one or more of the streams, wherein the limiting includes reducing video quality, switching to audio only, and freezing visuals.

8. The computer program product of claim 5, wherein a predictive model anticipates exceeding the bandwidth while the bandwidth is below the first threshold, and wherein based on the anticipation begins routing the incoming network traffic for at least one of the one or more streams to the optimization analyzer.

9. A computer system, comprising:
 one or more processors; and a computer-readable memory coupled to the one or more processors, the computer-readable memory comprising instructions for:
  continuously monitoring, by a router on a local network, incoming network traffic from a source external to the local network, to detect that a bandwidth of incoming network traffic exceeds a first threshold;
  in response to detecting the bandwidth exceeds the first threshold, detecting a source IP address of the incoming network traffic, intercepting the incoming network traffic to one or more local devices and sending a request to a source of the incoming network traffic to temporarily alter the all incoming network traffic to reduce overall bandwidth before redirecting the altered network traffic to an optimization analyzer, wherein the optimization analyzer analyzes the one or more incoming streams to identify one or more of the streams for alteration;
  in response to identifying one or more of the incoming streams for alteration;
  for each identified incoming stream,
  continuously altering the identified incoming stream; and
  re-directing the altered stream to the local device; and
  in response to the bandwidth of the altered incoming network traffic falling below a second threshold, stopping the temporarily altering of the incoming network traffic and routing all the incoming network traffic directly to the one or more local devices.

10. The computer system of claim 9, wherein the incoming network traffic comprises one or more streams, wherein each of the one or more streams comprises video and audio, and/or wherein each of the one or more streams is destined to one or more of the local devices.

11. The computer system of claim 9, further comprising:
 training an optimizing analyzer to recognize movement, sound, and absence of sound from one or more streams of the incoming network traffic;
 predicting, by the trained optimizing analyzer, that the bandwidth is exceeded before the bandwidth exceeds the first threshold; and
 based on the predicting and based on an amount of available remaining bandwidth, limiting bandwidth allocated to one or more of the streams, wherein the limiting includes reducing video quality, switching to audio only, and freezing visuals.

12. The computer system of claim 9, wherein a predictive model anticipates exceeding the bandwidth while the bandwidth is below the first threshold, and wherein based on the anticipation begins routing the incoming network traffic for at least one of the one or more streams to the optimization analyzer.

* * * * *